(12) United States Patent
Cambridge

(10) Patent No.: US 7,674,298 B1
(45) Date of Patent: Mar. 9, 2010

(54) METHOD AND APPARATUS FOR IMPLEMENTING A HANDHELD SECURITY SYSTEM

(75) Inventor: Rodney D. Cambridge, Middlesex (GB)

(73) Assignee: McAfee, Inc., Santa Clara, CA (US)

( * ) Notice: Subject to any disclaimer, the term of this patent is extended or adjusted under 35 U.S.C. 154(b) by 1148 days.

(21) Appl. No.: 09/916,607

(22) Filed: Jul. 26, 2001

Related U.S. Application Data

(60) Provisional application No. 60/280,607, filed on Mar. 30, 2001.

(51) Int. Cl.
*G08B 13/00* (2006.01)
*H04L 9/32* (2006.01)

(52) U.S. Cl. .......................................... 726/35; 713/168

(58) Field of Classification Search ................. 380/247; 455/421; 726/35; 713/168
See application file for complete search history.

(56) References Cited

U.S. PATENT DOCUMENTS

| | | | | |
|---|---|---|---|---|
| 4,639,726 | A | 1/1987 | Ichikawa et al. | 340/825.44 |
| 5,345,383 | A * | 9/1994 | Vance | 701/32 |
| 5,646,593 | A | 7/1997 | Hughes et al. | 340/573 |
| 5,712,973 | A | 1/1998 | Dayan et al. | 395/186 |
| 5,842,118 | A * | 11/1998 | Wood, Jr. | 455/101 |
| 5,960,085 | A | 9/1999 | De La Huerga | 380/25 |
| 6,081,704 | A | 6/2000 | Oshima | 455/410 |
| 6,087,937 | A | 7/2000 | McCarthy | 340/567 |
| 6,124,805 | A | 9/2000 | Gabbard | 340/825.72 |
| 6,144,314 | A | 11/2000 | Yasue | 340/825.44 |
| 6,148,205 | A * | 11/2000 | Cotton | 455/435.1 |
| 6,150,928 | A * | 11/2000 | Murray | 340/426.14 |
| 6,174,205 | B1 | 1/2001 | Madsen et al. | 439/638 |
| 6,175,922 | B1 | 1/2001 | Wang | 713/182 |
| 6,181,284 | B1 | 1/2001 | Madsen et al. | 343/702 |
| 6,326,891 | B1 * | 12/2001 | Lin | 340/573.4 |
| 6,408,172 | B1 * | 6/2002 | Alperovich et al. | 455/404.1 |
| 6,433,685 | B1 * | 8/2002 | Struble et al. | 340/571 |
| 6,449,726 | B1 * | 9/2002 | Smith | 713/340 |
| 6,594,762 | B1 * | 7/2003 | Doub et al. | 726/35 |
| 6,609,656 | B1 * | 8/2003 | Elledge | 235/382 |
| 6,614,350 | B1 * | 9/2003 | Lunsford et al. | 340/572.1 |
| 6,631,271 | B1 * | 10/2003 | Logan | 455/456.1 |
| 6,678,728 | B1 * | 1/2004 | Uppunda et al. | 709/222 |
| 6,804,699 | B1 * | 10/2004 | Henrie | 709/203 |
| 6,901,057 | B2 * | 5/2005 | Rune et al. | 370/310 |
| 2001/0002211 | A1 * | 5/2001 | Lee | 379/414 |
| 2001/0007817 | A1 * | 7/2001 | Odagiri et al. | 455/421 |
| 2001/0053947 | A1 * | 12/2001 | Lenz et al. | 700/117 |
| 2002/0016838 | A1 * | 2/2002 | Geluc et al. | 709/224 |

(Continued)

*Primary Examiner*—Michael Pyzocha
(74) *Attorney, Agent, or Firm*—Zilka-Kotab, PC

(57) ABSTRACT

Methods and apparatus for providing security to Bluetooth-enabled handheld or portable devices are disclosed. According to one aspect of the present invention, a handheld security system includes a control unit and a device. The control unit is Bluetooth-enabled, and has an associated communications range. The device, which is also Bluetooth-enabled, is registered with the control unit such that the device cooperates with the control unit using Bluetooth communications to determine when the device is within the range of communications of the control unit. When it is determined that the device is within the range of communications of the control unit, the device is allowed to remain functional. Alternatively, when it is determined that the device is not within the range of communications of the control unit, the device is rendered to be substantially non-functional.

25 Claims, 6 Drawing Sheets

U.S. PATENT DOCUMENTS

| | | |
|---|---|---|
| 2002/0077060 A1* | 6/2002 | Lehikoinen et al. ........... 455/41 |
| 2002/0077077 A1* | 6/2002 | Rezvani et al. .............. 455/410 |
| 2002/0078393 A1* | 6/2002 | Parker ........................ 713/324 |
| 2002/0091785 A1* | 7/2002 | Ohlenbusch et al. ........ 709/208 |
| 2002/0121975 A1* | 9/2002 | Struble et al. ............... 340/571 |
| 2002/0123325 A1* | 9/2002 | Cooper ........................ 455/411 |
| 2003/0122655 A1* | 7/2003 | Hum et al. .................. 340/10.3 |

* cited by examiner

METHOD AND APPARATUS FOR IMPLEMENTING A HANDHELD SECURITY SYSTEM

CROSS REFERENCE TO RELATED APPLICATION

The present invention claims priority under 35 U.S.C. 119 of U.S. Provisional Patent Application No. 60/280,607, filed Mar. 30, 2001, which is incorporated herein by reference in its entirety.

BACKGROUND OF THE INVENTION

1. Field of Invention

The present invention relates generally to security systems for handheld devices. More particularly, the present invention relates to a security system for Bluetooth-enabled handheld devices.

2. Description of the Related Art

The use of handheld devices such as personal digital assistants (PDAs), laptop computers, and cellular telephones is already popular, and is becoming more popular due to continual technological advances which allow the size of such devices to be reduced. Technological advances also allow the capability of handheld devices to be improved, i.e., the functionality of such devices is increased, further increasing the desirability of such devices. As the size of handheld devices diminishes, while the capability of the handheld devices increases, the use of many different handheld devices by a single user is also becoming increasingly prevalent. It is not uncommon for a user to have multiple handheld devices, e.g., a PDA and a cellular telephone, in his possession at any given time.

Bluetooth is a relatively new communications technology that allows wireless communications to occur between two or more Bluetooth-enabled, or Bluetooth equipped, devices, as will be appreciated by those skilled in the art. Bluetooth is one standard way of communicating between handheld devices or machines which is becoming increasingly popular.

Bluetooth wireless technology, which is described in the Bluetooth specification located on the World Wide Web at http://www.bluetooth.com and is incorporated herein by reference in its entirety, allows users to make essentially effortless, wireless, and instant connections between various communication devices. In general, such communication devices include mobile phones, desktop computers, and notebook computers. Since Bluetooth wireless technology typically uses radio transmissions, the transfer of both voice signals and data signals is effectively achieved in real-time. The mode of transmission adopted in the Bluetooth specification generally ensures the security of signals that are transmitted, and provides protection from interference.

When Bluetooth-enabled handheld devices are within a close proximity to each other, communications between the devices may automatically occur, without input from a user. Hence, in corporate environments, Bluetooth-enabled handheld devices are particularly desirable since many users may have Bluetooth-enabled handheld devices which may communicate with each other to automatically exchange information.

As the use of handheld devices such as those which are Bluetooth-enabled becomes more widespread, the likelihood that handheld devices are lost or stolen also increases. Hence, anyone who uses handheld devices may wish to protect them. The small size of the handheld devices makes it relatively easy for an owner or a user to lose track of the devices, as for example by misplacing the devices. The desirability of the handheld devices increases the likelihood that an individual who locates a lost device will maintain possession of the device, even if it is clear, e.g., from an identification tag, who rightfully owns the device.

In addition, the size of the handheld devices makes it relatively easy for the devices to be stolen by thieves, and concealed. Once stolen, due to their popularity, it may be relatively easy for thieves to resell the devices. For example, a black market for handheld devices is likely to grow as the desirability of the devices increases. The ability to relatively easily sell stolen handheld devices increases the risk that such devices may be stolen.

Therefore, what is needed is a system and a method for deterring thieves from attempting to steal handheld devices. Specifically, what is desired is a system and a method for substantially preventing a Bluetooth-enabled handheld device from being used once the handheld device is no longer in the possession of the owner of the device, and for alerting the owner that the device is no longer in his possession.

SUMMARY OF THE INVENTION

The present invention relates to a security system for Bluetooth-enabled handheld or portable devices. According to one aspect of the present invention, a handheld security system includes a control unit and a device. The control unit is Bluetooth-enabled, and has an associated communications range. The device, which is also Bluetooth-enabled, is registered with the control unit such that the device cooperates with the control unit using Bluetooth communications to determine when the device is within the range of communications of the control unit. When it is determined that the device is within the range of communications of the control unit, the device is allowed to remain functional. Alternatively, when it is determined that the device is not within the range of communications of the control unit, the device is rendered to be substantially non-functional.

In one embodiment, the device is configured to periodically send an identifying signal to the control unit and the control unit is configured to send a return signal to the device when the identifying signal is received by the control unit. In such an embodiment, the device may include a lockout interface. When the device includes a lockout interface, if the device does not receive the return signal in response to the identifying signal, the device is not within the range of communications of the control unit and the lockout interface locks out the device and causes the device to be substantially non-functional.

A handheld security system which performs automatic, periodic handshakes between a handheld device and a control unit with which the handheld device is registered serves as both a security system and a theft deterrent. The handheld security system warns a user when a handheld device registered with a control unit is out of range of the control unit, and enables the user to become aware of a misplaced handheld device relatively soon after the handheld device is misplaced. As such, the user may quickly retrieve a handheld device that is inadvertently left behind, search for a lost device, or alert proper authorities that the handheld device is no longer in his possession. The handheld security system also causes the handheld device to effectively cease being operational when it is out of range of the control unit, thereby preventing a thief, for instance, from being able to use the handheld device for its intended purpose.

According to another aspect of the present invention, a method for executing a security protocol for a first Bluetooth-enabled device with respect to a second Bluetooth-enabled device includes emitting a first Bluetooth transmission signal from the first Bluetooth-enabled device. A determination is then made as to whether a second Bluetooth transmission signal is received from the second Bluetooth-enabled device, e.g., in response to the first Bluetooth transmission signal. When it is determined that the second Bluetooth transmission signal is not received, then the first Bluetooth-enabled device is locked out and essentially prevented from functioning.

In one embodiment, the method includes determining when a predetermined period of time has elapsed. When it is determined that the predetermined period of time has elapsed, the first Bluetooth transmission signal is emitted from the first Bluetooth-enabled device. In another embodiment, the method also includes determining when a predetermined period of time has elapsed after locking out the first Bluetooth-enabled device, emitting the first Bluetooth transmission signal from the first Bluetooth-enabled device when it is determined that the predetermined period of time has elapsed, and determining when the second Bluetooth transmission signal is received from the second Bluetooth-enabled device in response to the first Bluetooth transmission signal emitted when it is determined that the predetermined period of time has elapsed. In such an embodiment, the lock out of the first Bluetooth-enabled device is reversed to allow the first Bluetooth-enabled device to function when it is determined that the second Bluetooth transmission signal is received.

According to still another aspect of the present invention, a method for executing a security protocol with respect to at least a first Bluetooth-enabled device and a second Bluetooth-enabled device includes determining when a first Bluetooth transmission signal is received from the second Bluetooth-enabled device, and emitting a second Bluetooth transmission signal when it is determined that the first Bluetooth transmission signal is received from the second Bluetooth-enabled device. When it is determined that the first Bluetooth transmission signal is not received from the second Bluetooth-enabled device, an alert is generated to indicate that the second Bluetooth-enabled device is not within a communications range of the first Bluetooth-enabled device. In one embodiment, determining when the first Bluetooth transmission signal is received from the second Bluetooth-enabled device includes determining when the second Bluetooth-enabled device is registered with the first Bluetooth-enabled device. Emitting the second Bluetooth transmission signal when it is determined that the first Bluetooth transmission signal is received from the second Bluetooth-enabled device may, in such an embodiment, include emitting the second Bluetooth transmission signal when it is determined that the second Bluetooth-enabled device is registered with the first Bluetooth-enabled device.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The need for providing an effective security system to reduce the risk of Bluetooth-enabled handheld devices being lost or stolen increases as the popularity of these devices grows. An effective security system enables an owner to better keep track of the Bluetooth-enabled handheld devices he owns. In addition, an effective security system may also serve as a deterrent that causes potential thieves to reconsider their actions before attempting to steal a Bluetooth-enabled handheld device.

As will be appreciated by those skilled in the art, Bluetooth-enabled devices have a communications ability that enables the devices to automatically communicate with one another. Such a communications ability may be expanded to allow Bluetooth-enabled devices to communicate with another Bluetooth-enabled device, e.g., a control unit, to establish that the devices are in proximity of the control unit and are, hence, essentially accounted for. When the devices are not successfully established as being in proximity of the control unit, then the devices may be prevented from functioning and, hence, effectively rendered useless.

By registering all Bluetooth-enabled handheld devices that are commonly owned, e.g., owned by an individual, with a Bluetooth-enabled control unit which is preferably continually in possession of or in the vicinity of the owner, the handheld devices may be prevented from operating when they are out of range of the control unit. As a result, such a handheld security system, e.g., a security system that includes a Bluetooth-enabled control unit and at least one Bluetooth-enabled handheld device, may serve as a deterrent to theft, as a stolen handheld device will generally fail to operate unless it is in the vicinity of the control unit.

Figure 1:
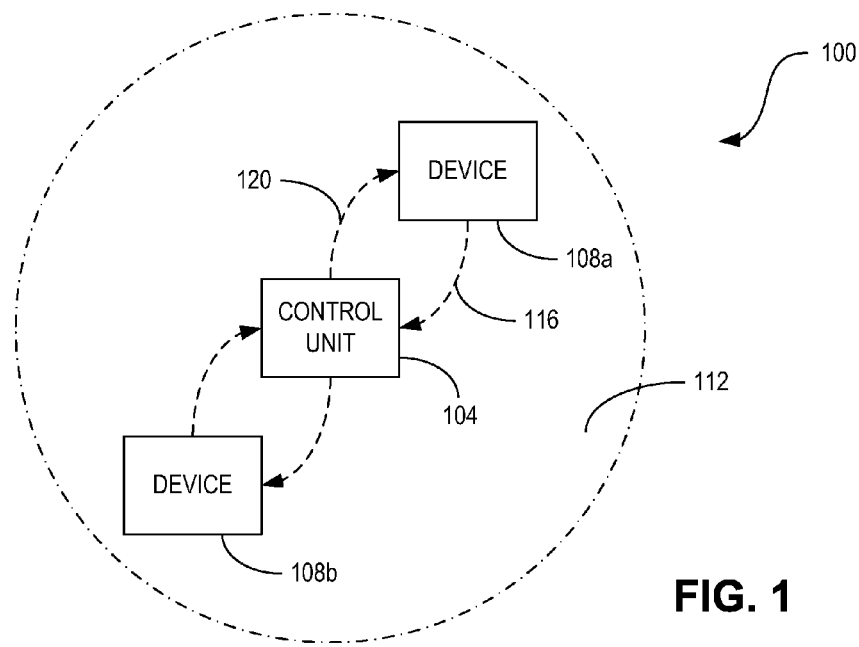
FIG. 1 is a representation of devices and a control unit that are part of a handheld security system and are in range of each other in accordance with an embodiment of the present invention.

FIG. 1 is a representation of a control unit and devices which are a part of a handheld security system in accordance with an embodiment of the present invention. A handheld security system 100 includes a control unit 104 and devices 108a, 108b. Control unit 104 is configured such that a user may easily keep the control unit in his possession. As such, control unit 104 may be a wrist-worn device that resembles, or even replaces, a watch to effectively ensure that the control unit stays with the user most of the time. It should be appreciated, however, that in general, control unit 104 may be in the form of any other portable device which is relatively unobtrusive and easy to carry. By way of example, control unit 104 may be a small device which resembles a pager, or control unit 104 may also be a small device which may be easily carried in a pocket.

Control unit 104 may contain a Bluetooth-enabled chip as a part of a Bluetooth-enabled transceiver that allows control unit 104 to transmit and to receive information from other Bluetooth-enabled chips, such as those included in devices 108a, 108b. That is, control unit 104 is configured to perform handshakes with devices 108a, 108b. In one embodiment, control unit 104 may include a liquid crystal display (LCD) display that allows control unit 104 to inform the user of the status of handheld security system 100, for example, control unit 104 may inform the user when handshakes with devices 108a, 108b have been successfully performed.

Devices 108a, 108b are registered with control unit 104. That is, devices 108a, 108b have been preset such that devices 108a, 108b operate substantially only when devices 108a, 108b are in proximity to control unit 104. Software controls and identify coding that are generally built into Bluetooth-enabled chips essentially ensure that only devices such as devices 108a, 108b which are preset to communicate with control unit 104 may successfully perform handshakes with control unit 104.

Control unit 104 or, more specifically, the Bluetooth-enabled chip in control unit 104, has a communications range 112. While devices 108a, 108b are within communications range 112, handshakes between control unit 104 and devices 108a, 108b will generally be successful, and devices 108a, 108b will continue to function. The Bluetooth-enabled chip included in control unit 104 preferably operates in a globally available frequency band to effectively ensure communication compatibility worldwide. The Bluetooth specification, which may be found on the World Wide Web at http://www-.bluetooth.com and has been incorporated by reference in its entirety, defines two power levels, namely a lower power level and a higher power level. The lower power level covers a shorter range, i.e., range 112 is specified as being up to approximately ten meters in substantially any direction from control unit 104. While the higher power level generally covers a longer range that may be up to approximately two times longer than the shorter range, the use of a higher power level consumes significantly more power than the lower power level.

To perform a handshake between device 108a and control unit 104, for example, device 108a may send a signal 116 to control unit 104 which, in effect, informs control unit that device 108a is within communications range 112. When control unit 104 receives signal 116, control unit 104 may respond to device 108a by sending a signal 120, thereby completing a handshake between control unit 104 and device 108a.

Like the Bluetooth-enabled chip in control unit 104, Bluetooth-enabled chips in devices 108a, 108b also have communications ranges (not shown). In general, communications ranges for devices 108a, 108b are set to be substantially the same as communications range 112. By way of example, if communications range 112 is a short range, then the communications ranges which correspond to devices 108a, 108b may also be short range. By setting communications ranges for devices 108a, 108b to be consistent with communications range 112, issues which may arise when a device may send a signal over a long range to control unit 104 while communications range 112 of control unit 104 is not large enough to enable a return signal to be sent to the device may be avoided. It should be appreciated, however, that a handshake between device 108a may generally still occur successfully when the communications ranges for device 108a differs from communications range 112.

If a device 108a, 108b is misplaced or stolen, device 108a, 108b is likely to be moved out of communications range 112.

Figure 2:
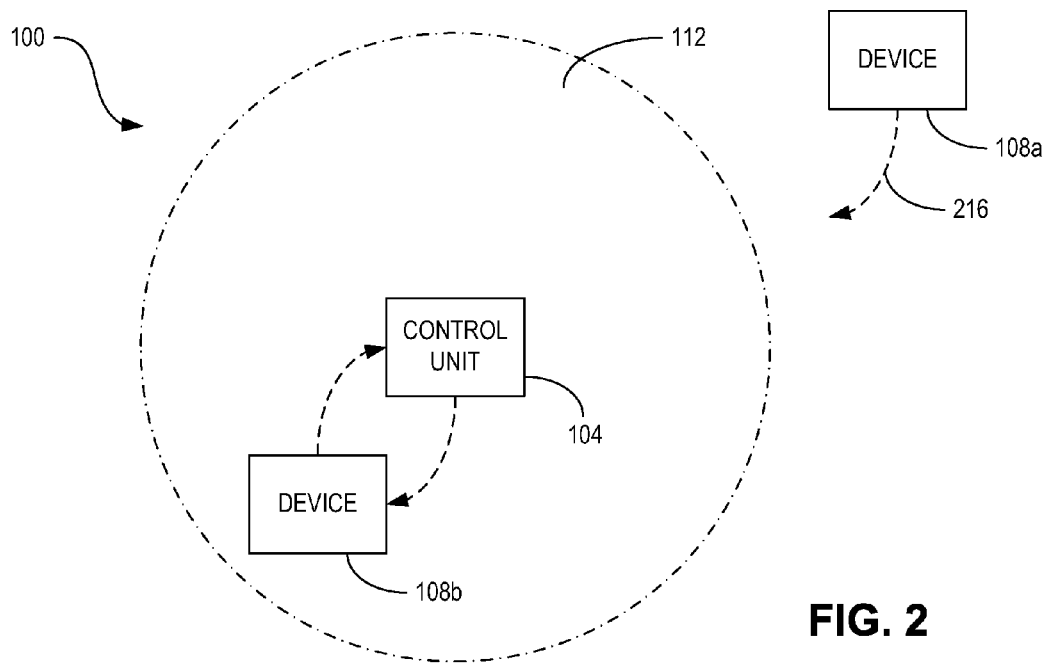
FIG. 2 is a representation of the devices and the control unit of FIG. 1 in which one of the devices is out of range of the control unit in accordance with an embodiment of the present invention.

As shown in FIG. 2, device 108a has been moved out of the range of control unit 104. When device 108a is out of communications range 112, and the communications range for device 108a is substantially the same as communications range 112, e.g., the communications range for device 108a and communications range 112 are both short range, a signal 216 sent from device 108a to control unit 104 is not successfully received by control unit 104. Hence, control unit 104 does not send a return signal to device 108a, and a handshake fails to occur between control unit 104 and device 108a. When a handshake fails, device 108a may be prevented from functioning, as discussed below, for example, with respect to FIGS. 3a and 3b. Since device 108a is essentially worthless unless device 108a is near control unit 104, opportunistic thieves may not see device 108a as being desirable to acquire.

When device 108a is out of range of control unit 104, control unit 104 will generally alert the owner or the user of device 108a that device 108a is out of range. Hence, if device 108a has been accidentally left behind by the owner, the owner may then take steps to retrieve device 108a. Having control unit 104 alert the owner as soon as an unsuccessful handshake occurs between device 108a and control unit 104 enables the owner to more quickly realize that device 108a is no longer in his possession than if the owner were left to discover that device 108a was missing on his own. As a result, the owner may be less prone to losing device 108a, either by theft or by inadvertently leaving device 108a behind.

Figure 3A:
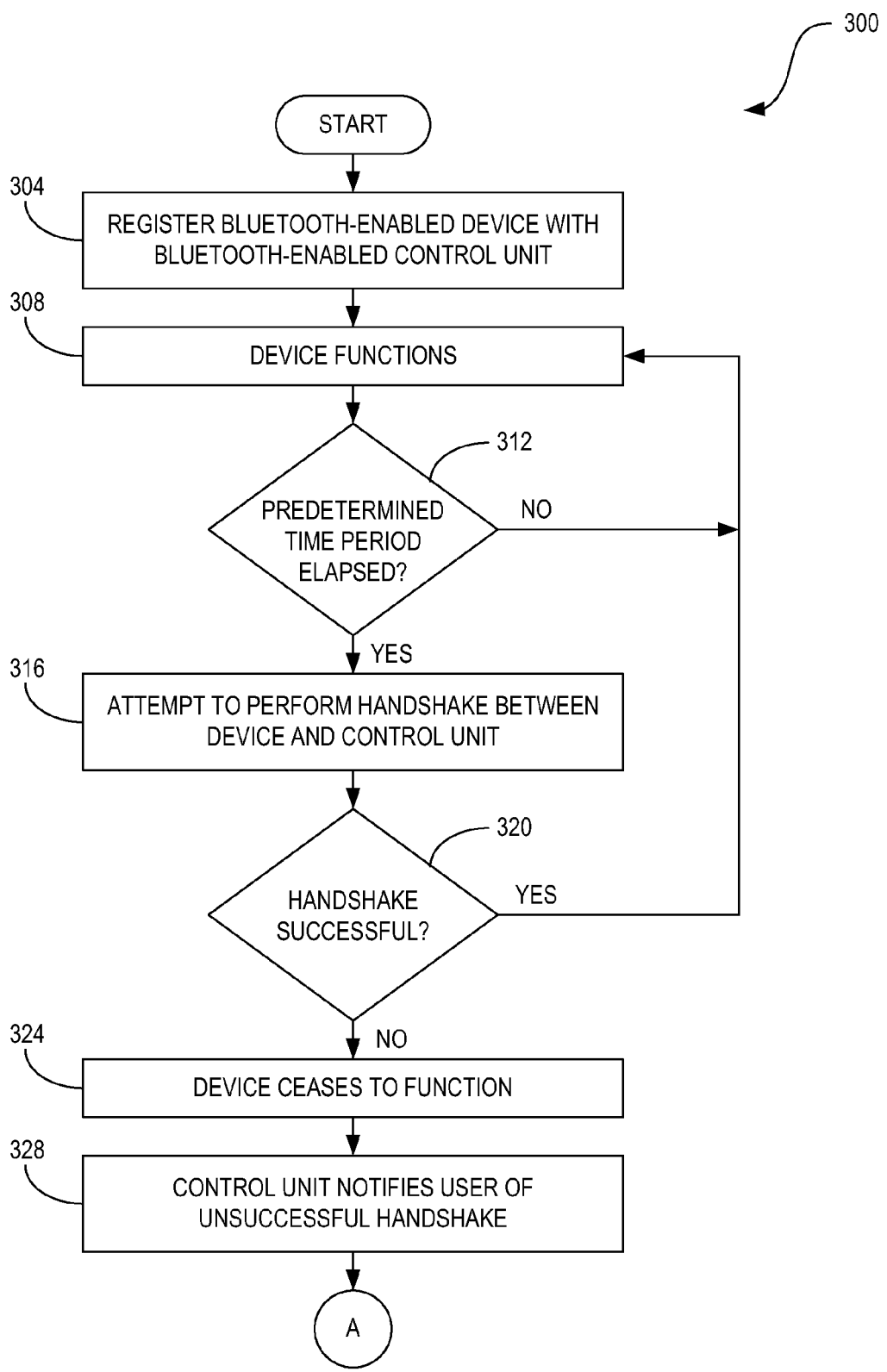
FIGS. 3a and 3b are a process flow diagram which illustrates the steps associated with a method of operation of a handheld security system in accordance with an embodiment of the present invention.
Figure 3B:
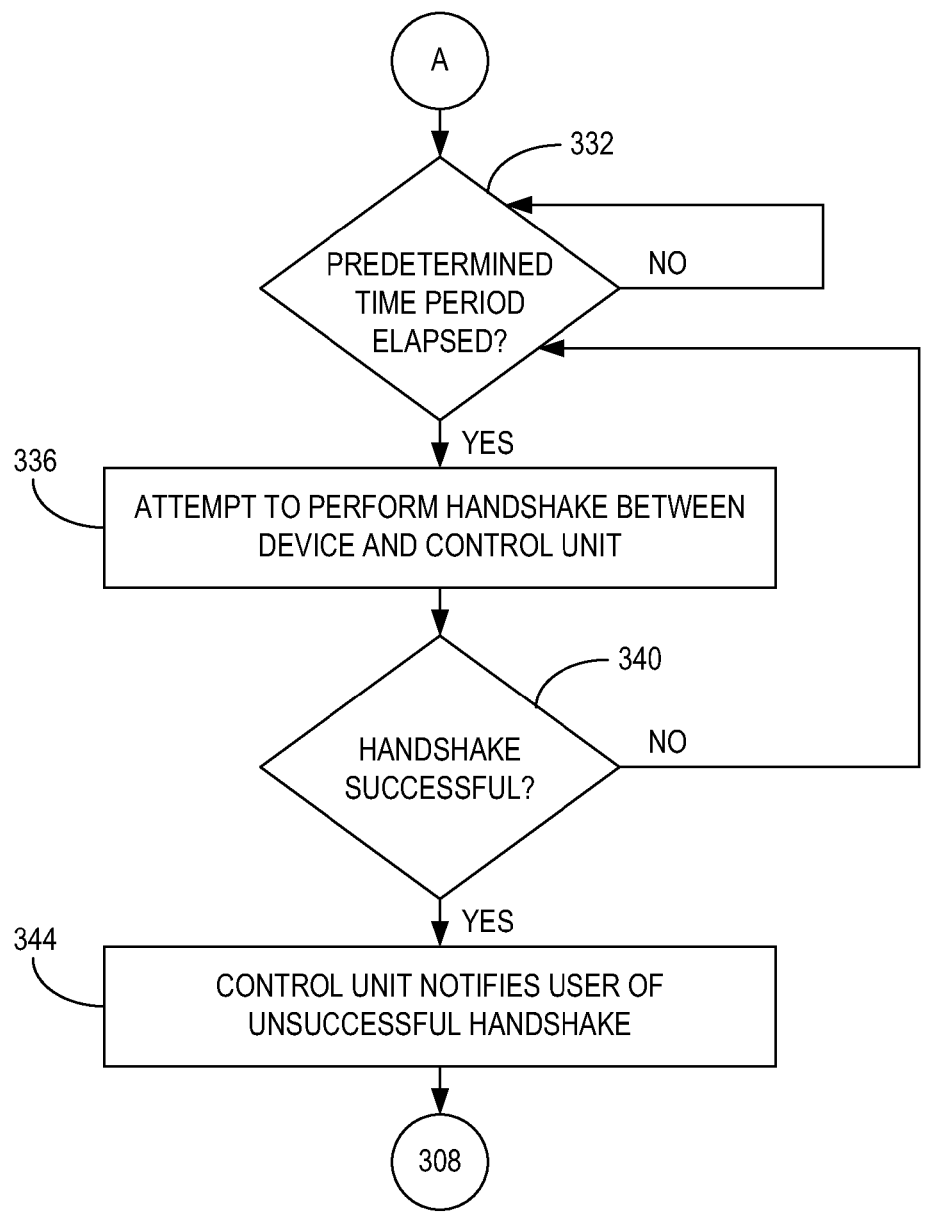

With reference to FIGS. 3a and 3b, the steps associated with method of operation of a handheld security system, e.g., handheld security system 100, will be described in accordance with an embodiment of the present invention. A process 300 of operating a handheld security system or a handheld security protocol begins at step 304 in which a device, e.g., a handheld device 108a, is registered with a control unit such as control unit 104. In the described embodiment, both handheld device 108a and control unit 104 are Bluetooth-enabled. When a device 108a is purchased or, more generally, obtained, the device may be registered or locked such that the device only functions when the device is in proximity to the control unit. In order to register device 108a, control unit 104 may send a message to the device that then sends identifying information to the control unit. Control unit 104 may then store the identifying information which pertains to device 108a. Similarly, device 108a stores information that identifies control unit 104 with which the device is registered.

In order for the device to be registered with control unit 104, device 108a may not already be registered with another control unit. That is, before a previously registered device 108a may effectively be reregistered with a control unit 104, the device is first deregistered or unlocked from the control unit with which the device was previously registered. Such deregistering may generally occur when the device is in proximity to the control unit with which the device was previously registered, and may include sending an encrypted key to the device. Alternatively, deregistering of the device may be performed by an authorized provider of handheld security systems if the associated control unit with which the device is registered is unavailable for legitimate reasons, e.g., when an owner of both the device and the control unit is able to prove that he owns the device and that the control unit is not functioning.

Once the device is registered in step 304, the device functions or operates as intended in step 308. By way of example, if a device 108a is a handheld device such as a PDA, a user may be able to input information into and retrieve information from the device. Or, if device 108a is a laptop computer, a user may be able to access information stored on the device, and to execute applications on the device. While device 108a functions, the device monitors a clock or similar device, as when a predetermined time period has elapsed, the device attempts to contact control unit 104 to verify that the device is in proximity to the control unit. It should be appreciated that the predetermined time period may vary depending upon the requirements of a particular owner or user. For instance, if the owner rarely leaves a particular area, and spends much of his time alone, then the owner may set the predetermined time period to be relatively long, e.g., approximately one hour. Alternatively, if the owner spends much of his time traveling, the owner may set the predetermined time period to be relatively short, e.g., approximately fifteen minutes. Typically, as long as device 108a has power, the device will attempt to contact the control unit periodically.

It is determined in step 312 whether the predetermined time period has elapsed. If it is determined that the predetermined time period has not elapsed, device 108a continues to function in step 308. On the other hand, if it is determined that the predetermined time period has elapsed, then an attempt is made in step 316 to perform a handshake between device 108a and control unit 104. The steps associated with performing a handshake will be described below with reference to FIGS. 4 and 5.

After a handshake is attempted, a determination is made in step 320 regarding whether the handshake attempt was successful. If it is determined that the handshake attempt was successful, then the indication is that device 108a is still in proximity to control unit 104. That is, device 108a and control unit 104 are in range of each other. Hence, device 108a continues to function in step 308. On the other hand, if the determination in step 320 is that the handshake was not successful, then the implication is that either device 108a is no longer in proximity to control unit 104, or that at least one of the device and the control unit has failed, e.g., has lost power. Typically, the implication is that device 108a is no longer in the communications range of control unit 104. As such, when the handshake is not successful, the device ceases to function or is effectively locked out in step 324.

Device 108a may cease to function when a locking interface of the device is activated. Such a locking interface may monitor handshakes, and when an attempted handshake has failed, the locking interface may perform a low level function to disable device 108a. For instance, the locking interface may cause a "lockout" screen of device 108a to display a message which warns that the device is either lost or stolen, and will not be able to operate until control unit 104 with which the device is registered is brought into proximity with the device. The screen may also provide contact information that may be used by someone who locates device 108a to identify the owner of the device.

Once device 108a ceases to function, control unit 104 warns the owner or user of an unsuccessful handshake in step 328. Warning the user of a failed handshake may include displaying information relating to device 108a and sounding an audible alarm that attracts the attention of the owner. Once the attention of the owner is attracted, the owner may then take steps to retrieve device 108a. By way of example, the owner may initiate a search for device 108a, or the owner may contact a registered organization or provider that compiles a list of lost or stolen devices to add his device to the list. The registered organization or provider may maintain a website which lists serial numbers of all missing devices which potential buyers may consult to determine if the devices that they are considering purchasing are included in the list.

In one embodiment, after device 108a is locked out, the device may continue to attempt to initiate handshakes with the control unit. Accordingly, in step 332, a determination is made as to whether the predetermined time period between attempts at making a handshake has elapsed. Until the predetermined time period has elapsed, device 108a does not attempt to perform another handshake. When it is determined that the predetermined time period has elapsed, an attempt is made in step 336 to perform a handshake between device 108a and control unit 104.

Once the attempt is made to perform a handshake in step 336, it is determined in step 340 whether the handshake was successful. If it is determined that the handshake was not successful, process flow returns to step 332 in which a determination is made regarding whether the predetermined time period has elapsed. Alternatively, if it is determined that the handshake was successful, control unit 104 may notify the owner or the user of a successful handshake in step 334. Upon the completion of a successful handshake, device 108a begins to function again, and process flow returns to step 308 in which the device continues to function.

Figure 4:
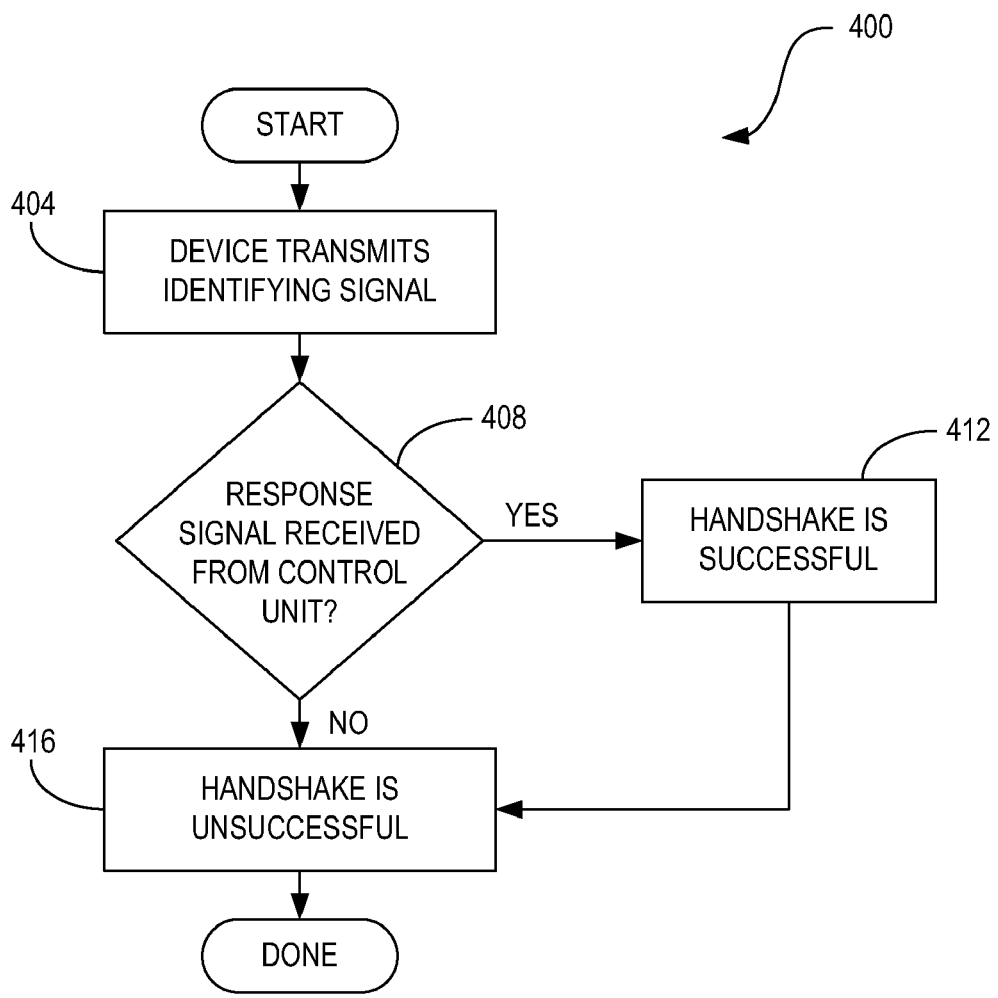
FIG. 4 is a process flow diagram which illustrates the steps associated with performing a handshake using a device in accordance with an embodiment of the present invention.
Figure 5:
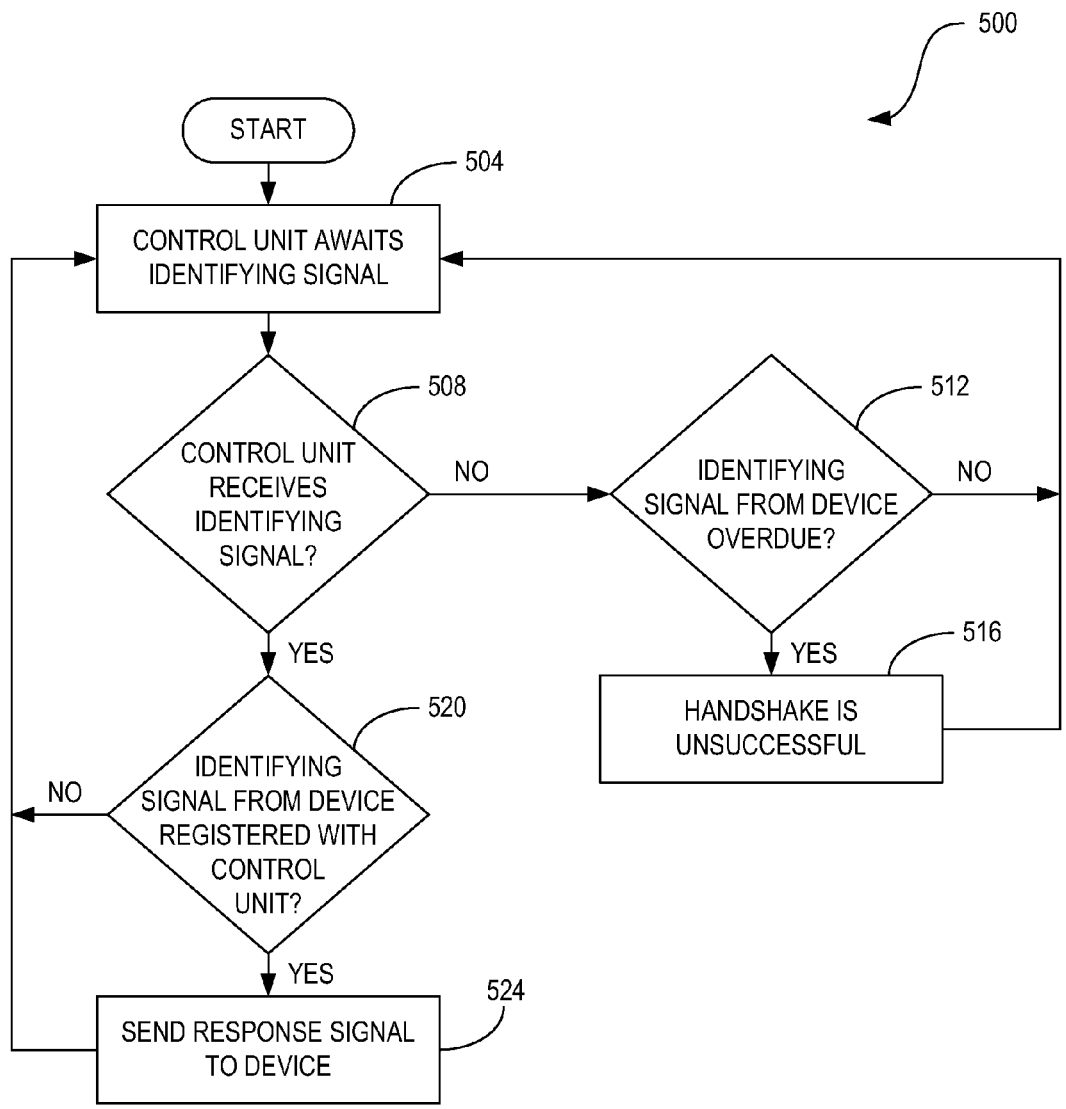
FIG. 5 is a process flow diagram which illustrates the steps associated with performing a handshake using a control unit in accordance with an embodiment of the present invention.

The steps associated with performing a handshake will be discussed below with respect to FIGS. 4 and 5. FIG. 4 is a process flow diagram which illustrates the steps associated with performing a handshake from the point-of-view of a device 108a in accordance with an embodiment of the present invention, while FIG. 5 is a process flow diagram which illustrates the steps associated with performing a handshake from the point-of-view of a control unit 104 in accordance with an embodiment of the present invention. In a locked state, or a state in which a device 108a is registered to a control unit 104, the device sends a message periodically to the control unit. When control unit 104 responds to confirm that the message was received, a handshake between control unit 104 and device 108a is essentially completed.

Referring to FIG. 4, a process 400 of performing a handshake from the point-of-view of a device 108a begins at step 404 in which the device transmits an identifying signal. The signal, in one embodiment, is transmitted using a Bluetooth-enabled radio or transceiver that is part of device 108a, and includes a bit stream that uniquely identifies the device. Once the identifying signal is transmitted, device 108a awaits a response from control unit 104 with which the device is registered. It is determined in step 408 whether a response signal is received from control unit 104. If it is determined that a response signal was not received from control unit 104 within an expected length of time, e.g., five seconds or less, then the handshake is effectively recorded as being unsuccessful in step 416, and the process of performing a handshake is terminated. Alternatively, if it is determined that a response signal was received from control unit 104 within the expected length of time, then the handshake is effectively recorded as being successful in step 412, and the process of performing a handshake is successfully completed.

With reference to FIG. 5, a process 500 of performing a handshake from the point-of-view of a control unit 104 begins at step 504 in which the control unit awaits an identifying signal from a device 108a. It should be appreciated that control unit 104 may be associated with multiple devices, i.e., an owner may have more than one handheld device he wishes to keep track of. By way of example, a control unit 104 may include up to seven "slave" devices, or handheld devices which are registered with the control unit, as specified by the current Bluetooth specification. As such, control unit 104 may expect identifying signals from more than one device 108a, 108b.

Bluetooth wireless technology generally supports both point-to-point and point-to-multipoint connections. As stated above, as many as seven, or possibly more, "slave" devices may currently be set to communicate with a "master" radio in one device, i.e., control unit 104. Several of these "piconets" may be established and linked together substantially as "scatternets" to allow communication among continually flexible configurations. Typically, substantially all devices 108*a*, 108*b* in the same piconet have priority synchronization, although other devices may be set to enter at any time. Such a topology may be described as a flexible, multiple piconet structure, as described in current Bluetooth specification.

A determination is made in step 508 regarding whether control unit 104 has received an identifying signal. If it is determined that the control unit has not received an identifying signal, then in step 512, it is determined whether the identifying signal from a particular device 108*a*, 108*b* is overdue. That is, it is determined if an identifying signal from a particular device 108*a*, 108*b* has not been received after a predetermined time period has elapsed. As identifying signals are expected periodically from the particular device 108*a*, 108*b*, if an identifying signal has not been received when expected, the indication may be that the device is not within the range of control unit 104. Accordingly, process flow moves from step 512 to step 516 in which the handshake is recorded as being unsuccessful. Once the handshake is recorded as being unsuccessful, control unit 104 awaits an identifying signal in step 504. Alternatively, if it is determined in step 512 that an identifying signal from a particular device 108*a*, 108*b* is not overdue, process flow returns directly to step 504 in which control unit 104 awaits an identifying signal.

Returning to step 508, if it is determined that an identifying signal has been received, a determination is made in step 520 as to whether the identifying signal was transmitted from a device 108*a* which is registered with control unit 104. When it is determined that the identifying signal is not from a device which is registered with the control unit, the indication is that the control unit is in the range of a device which is registered with a different control unit. If the identifying signal is from a device which is not registered with control unit 104, the control unit may essentially ignore the identifying signal, and process flow returns to step 504 in which the control unit waits for another identifying signal to be received.

On the other hand, if it is determined in step 520 that the received identifying signal is from a device 108*a*, 108*b* which is registered with control unit 104, then the indication is that the device is still in the range of the control unit. As such, control unit 104 sends a response signal to the appropriate device 108*a*, 108*b* in step 524 using a Bluetooth-enabled radio associated with the control unit. In general, the response signal may be arranged to inform the appropriate device 108*a*, 108*b* that the identifying signal transmitted by the device was successfully received. Once the response signal is sent, control unit 104 awaits another identifying signal in step 504.

Figure 6:
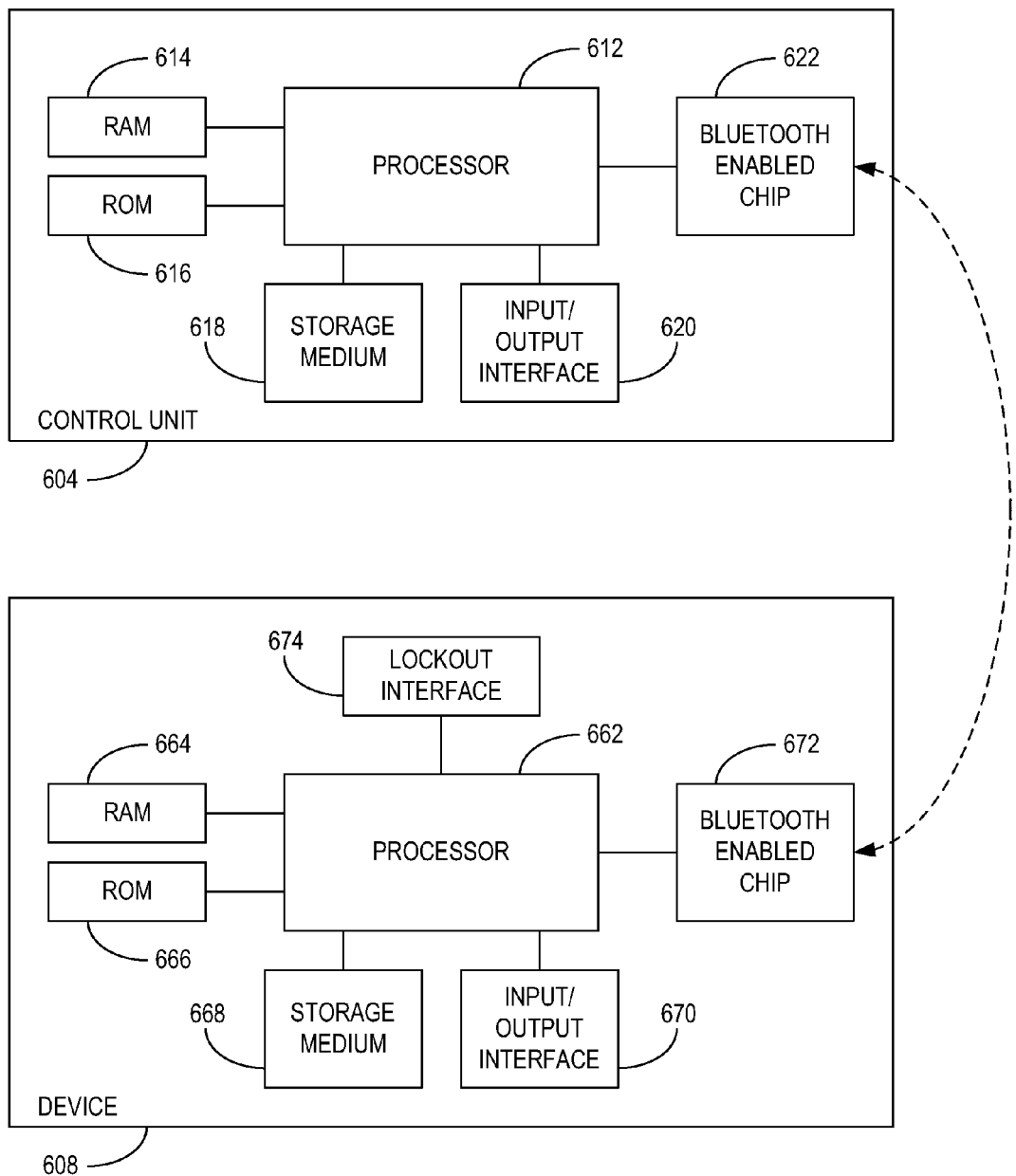
FIG. 6 is a representation of a control unit and a device which is registered to the control unit in accordance with an embodiment of the present invention.

As mentioned above, a control unit and a device of the present invention typically each include a Bluetooth-enabled radio, e.g., a transceiver that is suitable for emitting and receiving Bluetooth signals. In general, a Bluetooth-enabled radio includes a Bluetooth-enabled chip which enables substantially instant connections to be made with other Bluetooth-enabled chips. Once connections are established, wireless communications may then occur substantially in real-time using the Bluetooth-enabled chips. FIG. 6 is a representation of a control unit and a handheld device that are part of a handheld security system in accordance with an embodiment of the present invention. A control unit 604 may be a computing device such as a wrist-worn device that resembles or, in one embodiment, replaces a watch. A handheld device 608 may be a portable computing device, or any other portable device. For example, handheld device 608 may be a PDA, a laptop computer, a pager, a portable entertainment device such as a radio or television, a mobile or cellular telephone, or any other handheld device.

Control unit 604 generally includes at least one processor 612, or a central processing unit (CPU), that is coupled to memory devices including, but not limited to, a primary storage device 614 such as a random access memory (RAM) and a primary storage device 616 such as a read only memory (ROM). ROM acts to transfer data and instructions uni-directionally to processor 612, while RAM is used typically to transfer data and instructions in a bi-directional manner. Both RAM 614 and ROM 616 may include any suitable computer-readable media. A secondary storage medium 618, which is typically a mass memory device, is also coupled bi-directionally to processor 612, and provides additional data storage capacity. Storage medium 618 is a computer-readable medium that may be used to store programs including computer code, data, and the like. Typically, storage medium 618 is a medium such as a hard disk or a tape which is generally slower to access than either RAM 614 and ROM 616. However, storage medium 618 may take the form of a magnetic or paper tape reader, a floppy disk, a digital versatile disk, a CD-ROM, or substantially any other well-known storage device. It should be appreciated that the information retained within storage medium 618, may, in appropriate cases, be incorporated in standard fashion as part of RAM 614 as virtual memory. ROM 616 may be a device such as a CD-ROM may that passes data uni-directionally to the processor 612.

Processor 612 is coupled to one or more input/output interfaces 620 that may include, but are not limited to, devices such as video monitors or display screens, track balls, mice, keyboards, microphones, touch-sensitive displays, transducer card readers, magnetic or paper tape readers, tablets, styluses, voice or handwriting recognizers, or other well-known input devices such as, for instance, other computers. In one embodiment, processor 612 may be coupled to a computer or telecommunications network, e.g., a local area network, an internet network or an intranet network, using a network connection (not shown). With such a network connection, it is contemplated that processor 612 may receive information from the network, or may output information to the network in the course of performing the above-described method steps. Such information, which is often represented as a sequence of instructions to be executed using processor 612, may be received from and outputted to the network, for example, in the form of a computer data signal embodied in a carrier wave. The above-described devices and materials will be familiar to those of skill in the computer hardware and software arts.

A Bluetooth-enabled chip 622, which may be part of a Bluetooth-enabled radio or transceiver, is coupled to processor 612, and allows control unit 604 to transmit and to receive information from other Bluetooth-enabled chips using Bluetooth wireless technology. For example, when Bluetooth-enabled chip 622 of control unit 604 receives a signal from a Bluetooth-enabled chip 672 of device 608, Bluetooth-enabled chip 622 may then send a return signal to Bluetooth-enabled chip 672. It should be appreciated that communications between control unit 604 and device 608 generally occur automatically when control unit 604 and device 608 are located in proximity to one another.

In addition to Bluetooth-enabled chip 672, device 608 includes a processor 662, RAM 664, ROM 666, a storage medium 668, and an input/output interface 670. Device 608 also includes a lockout interface 674 which is in communication with processor 662. Lockout interface 674 is configured to cause device 608 to be locked out such that device 608 effectively ceases to function when a handshake between control unit 604 and device 608 or, more specifically, a handshake between Bluetooth-enabled chip 622 and Bluetooth-enabled chip 672, fails. By way of example, if device 608 is a laptop computer, lockout interface 674 may cause a lockout screen to be displayed, and deactivate input/output interface 670 such that the laptop computer is effectively unusable. Alternatively, if device 608 is a cellular telephone, lockout interface 674 may prevent outgoing calls from being placed and incoming calls from being answered.

Typically, lockout interface 674 may be implemented as an agent or program that may monitor handshakes that take place between control unit 604 and device 608. If lockout interface 674 observes that an attempt at a handshake has failed, e.g., that device 608 has sent an identifying signal and has not received a response signal in return, then lockout interface 674 may perform a low level function to disable device 608. Hence, lockout interface 674 effectively causes device 608 to be locked out until device 608 returns to the range of control unit 604. Alternatively, lockout interface 674 may be implemented by modifying Bluetooth code associated with device 608.

Although only a few embodiments of the present invention have been described, it should be understood that the present invention may be embodied in many other forms without departing from the spirit or the scope of the present invention. By way of example, a handheld security system 100 has been described as being implemented using Bluetooth-enabled portable devices and control units. It should be appreciated, however, that the control unit of a handheld security system is not necessarily a handheld device. In one embodiment, a control unit 604 may be a relatively large device positioned in a building, and may be configured to perform handshakes with handheld devices which are to remain within the building. When a device 608*a* is removed from the building causing a handshake to fail, the device may then be deactivated.

Devices other than handheld devices may be Bluetooth-enabled. For example, the handheld security system of the present invention may be modified to provide security for devices such as desktop computers and video equipment. In other words, devices which are not necessarily handheld devices, but are Bluetooth-enabled devices, may be part of a security system which performs handshakes and lockouts. Such a security system may be used to prevent larger devices from being stolen from a building.

While a control unit 604 has been described as being configured to emit an audible alarm when a handshake fails, it should be appreciated that a handheld device 608 may also emit an audible alarm when a handshake fails without departing from the spirit or the scope of the present invention. When handheld device 608 emits an audible alarm, the handheld device is more likely to be located and, possibly, returned to its owner. In addition, if a handheld device is known to emit an audible alarm, in addition to ceasing to function, when it is away from its associated control unit, the handheld device may be considered to be even less desirable to steal.

A control unit such as control unit 604 may not necessarily be a dedicated control device. In other words, control unit 604 may be integrated into a handheld device such that the handheld device is operational at least in part as a control unit. By way of example, control unit 604 may be included as part of a Bluetooth-enabled PDA. Alternatively, a control unit may be integrated into a Bluetooth-enabled pager device.

In general, an owner may chose to purposely deregister or unlock a device such as device 608 with respect to a control unit such as control unit 604. For instance, the owner may wish to deregister device 608 to loan the device to another individual who may then register the device with his own control unit. Alternatively, device 608 may be registered with more than one control unit such that as long as the device is able to successfully handshake with one of the control units with which the device is registered, the device is able to continue to operate. By way of example, for a couple who each have possession of a control unit and who share a laptop computer, as long as one member of the couple is in possession of the laptop computer, the laptop computer will continue to function, even if the laptop computer is nowhere near the other member of the couple. The ability to register a single device 608 with more than one control unit 604 may reduce the need to deregister a device to effectively transfer the registration to a different device. Reducing the need to deregister a device 608 reduces the likelihood of neglecting to reregister the device with a control unit 604. Failing to register device 608 with any control unit 604 causes the device not to be protected by any handheld security system.

Although a communications range for Bluetooth-enabled devices has been described as being either a specified short range or a specified long range, it may be possible for a user to set a range. For instance, a user may be able to set a communications range that falls between the short range and the long range by modifying software associated with a Bluetooth-enabled chip.

Law enforcement agencies may use modified versions of a control unit such as control unit 604 to locate Bluetooth-enabled devices such as devices 608 which have been lost or stolen. When a device 608 is lost or stolen, identifying information about the device may be provided to a law enforcement agency. The law enforcement agency may then input the identifying information into a control unit 604, and use the control unit to attempt to initiate handshakes with device 608. By way of example, a law enforcement agent may carry a control unit 604 that is configured to attempt to initiate handshakes with multiple missing devices. When control unit 604 successfully completes a handshake, the control unit may sound an alarm and display a screen that identifies the device with which the handshake was completed. If device 608 also emits an alarm when the handshake is completed, the location of device 608 may be identified, and ultimately returned to its proper owner.

In general, the steps associated with methods of using a handheld security system 100, and of performing a handshake between Bluetooth-enabled devices, may be widely varied. Steps may be added, removed, altered, or reordered without departing from the spirit or the scope of the present invention. By way of example, instead of initiating a handshake from a handheld device 608, a handshake may instead be initiated from a control unit 604. When a handshake is initiated from control unit 604, if the handheld device 608 expects to receive a signal from the control unit and fails to receive the signal, the handheld device may then lock itself out. At the same time, when control unit 604 fails to receive acknowledgement from a handheld device 608 that a signal was properly received, then the control unit may sound an alarm.

The composition of an identifying signal that is sent from handheld device 608 to an associated control unit 604 may vary widely. In general, the identifying signal includes data that substantially uniquely identifies handheld device 608 to control unit 608 that allows the control unit to essentially verify that the handheld device is registered with the control unit. The identifying signal may also include other information that may be useful to the owner. The identifying signal may include, but is not limited to, information pertaining to the battery status of handheld device 608. For example, if the battery power in handheld device 608 falls below a certain threshold level, the identifying signal may include a warning that is displayed on control unit 604 when a handshake occurs. The owner may use the information displayed on control unit 604 to determine whether to replace the batteries in handheld device 608 before the batteries fail.

When device 608 is locked out, the device has generally been described above as continuing to initiate handshakes until a handshake is successful, at which time the device terminates the lock out and begins to function. In one embodiment, a device 608 may cease attempting to perform handshakes once the device is locked out. Instead, device 608 may need to be manually unlocked when it is located. For example, control unit 604 with which device 608 is registered may initiate communications with the device to end the lockout on the device without departing from the spirit or the scope of the present invention.

It should be understood that the present invention may generally be applied to devices which are enabled with substantially any suitable wireless technology that enables wireless, substantially instant connections to be made between various communications devices. By way of example, in lieu of implementing a handheld security system for devices which use Bluetooth wireless technology, the handheld security system may be implemented for devices which use Wireless Fidelity (WiFi) technology. WiFi technology is based on the Institute of Electrical and Electronics Engineers (IEEE) 802.11 specification and the IEEE 802.11b specification, which are each incorporated herein by reference in their entireties. A handheld security system which includes a WiFi-enabled control unit and a WiFi-enabled device may operate in substantially the same manner as a handheld security system which includes a Bluetooth-enabled control unit and a Bluetooth-enabled device. Therefore, the present examples are to be considered as illustrative and not restrictive, and the invention is not to be limited to the details given herein, but may be modified within the scope of the appended claims.

What is claimed is:

1. A handheld security system, comprising:
a Bluetooth-enabled control unit having a range of communications; and
a Bluetooth-enabled device, wherein the device is registered with the control unit such that the device cooperates with the control unit using Bluetooth communications to determine when the device is within the range of communications of the control unit, wherein when it is determined that the device is within the range of communications of the control unit, the device is functional, and when it is determined that the device is not within the range of communications of the control unit, the device is at least partially non-functional;
wherein the device is configured to periodically send an identifying signal to the control unit and the control unit is configured to send a return signal to the device when the identifying signal is received by the control unit;
wherein when the device is at least partially non-functional in a situation where it is determined that the device is not within the range of communications of the control unit, the device is configured to continue periodically sending the identifying signal to the control unit;
wherein the control unit is configured to produce an alert when it is determined that the device is not within the range of communications of the control unit;
wherein the control unit includes a control unit display, the control unit display being configured to display information associated with the device when it is determined that the device is not within the range of communications of the control unit;
wherein the device includes a device display, the device display being configured to display information associated with the control unit when it is determined that the device is not within the range of communications of the control unit;
wherein the device is configured to periodically send the identifying signal utilizing a period of time which is configured based on movements of an owner;
wherein the identifying signal includes information pertaining to a battery status of the device;
wherein the handheld security system is operable such that a range of communications of the device is set to match the range of communications of the control unit for avoiding signals of a first range from being received by the control unit from the device when the range of communications of the control unit is not large enough to enable a return signal to be sent from the control unit to the device;
wherein the handheld security system is operable such that, in response to the alert, the device is added to a list of lost or stolen devices;
wherein the handheld security system is operable such that the list of lost or stolen devices is maintained on a website for allowing a potential buyer of the device to determine whether the device is included in the list of lost or stolen devices.

2. The handheld security system according to claim 1 wherein the device includes a lockout interface, wherein when the device does not receive the return signal in response to the identifying signal, the device is not within the range of communications of the control unit and the lockout interface locks out the device and causes the device to be at least partially non-functional.

3. The handheld security system according to claim 2 wherein when the device receives the return signal, the lockout interface unlocks the device and causes the device to be functional.

4. The handheld security system according to claim 1 wherein the device is exclusively registered with the control unit.

5. The handheld security system according to claim 1 wherein the device display is configured to display a message that warns that the device is at least one of lost and stolen, when the device is at least partially non-functional.

6. The handheld security system according to claim 1 wherein the device display is configured to display contact information that is capable of being used by someone who locates the device to identify the owner of the device, when the device is at least partially non-functional.

7. The handheld security system according to claim 1 wherein the device is configured to periodically send the identifying signal utilizing the period of time of at least one hour for accommodating the owner who rarely leaves a particular area.

8. The handheld security system according to claim 1 wherein the device is configured to periodically send the identifying signal utilizing the period of time of less than 15 minutes for accommodating the owner who travels frequently.

9. The handheld security system according to claim 1 wherein the device is configured to periodically send the identifying signal as long as the device has access to power.

10. The handheld security system according to claim 1 wherein the control unit is a wrist-worn device.

11. The handheld security system according to claim 10 wherein the control unit is the wrist-worn device for effectively ensuring that the control unit stays with the owner.

12. The handheld security system according to claim 1 wherein the control unit is configured to attempt to initiate handshakes with multiple missing devices.

13. The handheld security system according to claim 1 wherein the handheld security system is operable such that the device is registered with multiple separate control units.

14. A method for executing a security protocol for a first Bluetooth-enabled device with respect to a second Bluetooth-enabled device, the method comprising:

periodically emitting a first Bluetooth transmission signal from the first Bluetooth-enabled device;

determining if a second Bluetooth transmission signal is received from the second Bluetooth-enabled device; and locking out the first Bluetooth-enabled device to at least partially prevent the first Bluetooth-enabled device from functioning if it is determined that the second Bluetooth transmission signal is not received, wherein the first Bluetooth-enabled device periodically emits the first Bluetooth transmission signal while being locked out in a situation where it is determined that the second Bluetooth transmission signal is not received;

wherein the second Bluetooth-enabled device is configured to produce an alert when it is determined that the second Bluetooth transmission signal is not received;

wherein the second Bluetooth-enabled device includes a second Bluetooth-enabled device display, the second Bluetooth-enabled device display being configured to display information associated with the first Bluetooth-enabled device when the first Bluetooth-enabled device is locked out;

wherein the first Bluetooth-enabled device includes a first Bluetooth-enabled device display, the first Bluetooth-enabled device display being configured to display information associated with the second Bluetooth-enabled device when the first Bluetooth-enabled device is locked out;

wherein the first Bluetooth-enabled device is configured to periodically emit the first Bluetooth transmission signal utilizing a period of time which is configured based on movements of an owner;

wherein the first Bluetooth transmission signal includes information pertaining to a battery status of the first Bluetooth-enabled device;

wherein a range of communications of the first Bluetooth-enabled device is set to match a range of communications of the second Bluetooth-enabled device for avoiding signals of a first range from being received by the second Bluetooth-enabled device from the first Bluetooth-enabled device when the range of communications of the second Bluetooth-enabled device is not large enough to enable a return signal to be sent from the second Bluetooth-enabled device to the first Bluetooth-enabled device;

wherein, in response to the alert, the first Bluetooth-enabled device is added to a list of lost or stolen devices;

wherein the list of lost or stolen devices is maintained on a website for allowing a potential buyer of the first Bluetooth-enabled device to determine whether the first Bluetooth-enabled device is included in the list of lost or stolen devices.

15. The method as recited in claim 14 wherein locking out the first Bluetooth-enabled device includes:

displaying information on the first Bluetooth-enabled device display of the first Bluetooth-enabled device which indicates that the first Bluetooth-enabled device is locked out.

16. The method as recited in claim 14 further including:

operating the first Bluetooth-enabled device if it is determined that the second Bluetooth transmission signal is received.

17. A method for executing a security protocol with respect to at least a first Bluetooth-enabled device and a second Bluetooth-enabled device, the method comprising:

determining when a first Bluetooth transmission signal is received from the second Bluetooth-enabled device, wherein the second Bluetooth-enabled device automatically and periodically emits the first Bluetooth transmission signal;

emitting a second Bluetooth transmission signal when it is determined that the first Bluetooth transmission signal is received from the second Bluetooth-enabled device; and generating an alarm to indicate that the second Bluetooth-enabled device is not within a communications range of the first Bluetooth-enabled device when it is determined that the first Bluetooth transmission signal is not received from the second Bluetooth-enabled device;

wherein after the generation of the alarm, the second Bluetooth-enabled device is configured to continue periodically emit the first Bluetooth transmission signal to the first Bluetooth-enabled device in a situation where it is determined that the first Bluetooth-enabled device is not within the range of communications of the second Bluetooth-enabled device;

wherein the second Bluetooth-enabled device includes a second Bluetooth-enabled device display, the second Bluetooth-enabled device display being configured to display information associated with the first Bluetooth-enabled device when it is determined that the first Bluetooth-enabled device is not within the range of communications of the second Bluetooth-enabled device;

wherein the first Bluetooth-enabled device includes a first Bluetooth-enabled device display, the first Bluetooth-enabled device display being configured to display information associated with the second Bluetooth-enabled device when it is determined that the first Bluetooth-enabled device is not within the range of communications of the second Bluetooth-enabled device;

wherein the second Bluetooth-enabled device is configured to periodically emit the first Bluetooth transmission signal utilizing a period of time which is configured based on movements of an owner;

wherein the first Bluetooth transmission signal includes information pertaining to a battery status of the second Bluetooth-enabled device;

wherein a range of communications of the first Bluetooth-enabled device is set to match the range of communications of the second Bluetooth-enabled device for avoiding signals of a first range from being received by the second Bluetooth-enabled device from the first Bluetooth-enabled device when the range of communications of the second Bluetooth-enabled device is not large enough to enable a return signal to be sent from the second Bluetooth-enabled device to the first Bluetooth-enabled device;

wherein, in response to the alert, the first Bluetooth-enabled device is added to a list of lost or stolen devices;

wherein the list of lost or stolen devices is maintained on a website for allowing a potential buyer of the first Bluetooth-enabled device to determine whether the first Bluetooth-enabled device is included in the list of lost or stolen devices.

18. The method as recited in claim 17 wherein determining when the first Bluetooth transmission signal is received from the second Bluetooth-enabled device includes:

determining when the second Bluetooth-enabled device is registered with the first Bluetooth-enabled device, wherein emitting the second Bluetooth transmission signal when it is determined that the first Bluetooth transmission signal is received from the second Bluetooth-enabled device includes emitting the second Bluetooth transmission signal when it is determined that the second Bluetooth-enabled device is registered with the first Bluetooth-enabled device.

19. A first device comprising:

a Bluetooth-enabled mechanism;

computer code that causes the Bluetooth-enabled mechanism to periodically emit a first Bluetooth transmission signal;

computer code that causes the Bluetooth-enabled mechanism to receive a second Bluetooth transmission signal from a second Bluetooth-enabled device;

computer code for determining when the second Bluetooth transmission signal is received;

computer code for locking out the first device to at least partially prevent the first device from being operational when it is determined that the second Bluetooth transmission signal is not received;

wherein the Bluetooth-enabled mechanism periodically emits the first Bluetooth transmission signal while the first device is locked out in a situation where it is determined that the second Bluetooth transmission signal is not received;

a processor for executing the computer codes; and a computer-readable medium that stores the computer codes;

wherein the second Bluetooth-enabled device is configured to produce an alert when it is determined that the second Bluetooth transmission signal is not received;

wherein the second Bluetooth-enabled device includes a second Bluetooth-enabled device display, the second Bluetooth-enabled device display being configured to display information associated with the first device when the first device is locked out;

wherein the first device includes a first device display, the first device display being configured to display information associated with the second Bluetooth-enabled device when the first device is locked out;

wherein the Bluetooth-enabled mechanism is configured to periodically emit the first Bluetooth transmission signal utilizing a period of time which is configured based on movements of an owner;

wherein the first Bluetooth transmission signal includes information pertaining to a battery status of the Bluetooth-enabled mechanism;

wherein the first device is operable such that a range of communications of the first device is set to match a range of communications of the second Bluetooth-enabled device for avoiding signals of a first range from being received by the second Bluetooth-enabled device from the first device when the range of communications of the second Bluetooth-enabled device is not large enough to enable a return signal to be sent from the second Bluetooth-enabled device to the first device;

wherein a website is utilized such that, in response to the alert, the first device is added to a list of lost or stolen devices;

wherein the website maintains the list of lost or stolen devices for allowing a potential buyer of the first device to determine whether the first device is included in the list of lost or stolen devices.

20. The first device according to claim 19 wherein the computer code for locking out the first device includes computer code for displaying information on the first device display to indicate that the first device is locked out when it is determined that the second Bluetooth transmission signal is not received.

21. The first device according to claim 19 wherein the Bluetooth-enabled mechanism is a Bluetooth-enabled radio.

22. A first device comprising:

a Bluetooth-enabled mechanism, the Bluetooth-enabled mechanism being configured to receive a first Bluetooth transmission signal from a second device that periodically emits the first Bluetooth transmission signal;

computer code for determining when a first Bluetooth transmission signal is received;

computer code for causing the Bluetooth-enabled mechanism to emit a second Bluetooth transmission signal when it is determined that the first Bluetooth transmission signal is received;

computer code for generating an alarm to indicate that the second device is not within a communications range of the first device when it is determined that the first Bluetooth transmission signal is not received;

wherein after the generation of the alarm, the second device is configured to continue periodically emitting the first Bluetooth transmission signal in a situation where it is determined that the first device is not within the range of communications of the second device;

a processor that executes the computer codes; and a computer-readable medium that stores the computer codes;

wherein the second device includes a second device display, the second device display being configured to display information associated with the first device when it is determined that the first device is not within the range of communications of the second device;

wherein the first device includes a first device display, the first device display being configured to display information associated with the second device when it is determined that the first device is not within the range of communications of the second device;

wherein the second device is configured to periodically emit the first Bluetooth transmission signal utilizing a period of time configured which is based on movements of an owner;

wherein the first Bluetooth transmission signal includes information pertaining to a battery status of the second device;

wherein the second device is operable such that a range of communications of the second device is set to match the communications range of the first device for avoiding signals of a first range from being received by the first device from the second device when the communications range of the first device is not large enough to enable a return signal to be sent from the first device to the second device;

wherein a website is utilized such that, in response to the alert, the second device is added to a list of lost or stolen devices;

wherein the website maintains the list of lost or stolen devices for allowing a potential buyer of the second device to determine whether the second device is included in the list of lost or stolen devices.

23. A handheld security system, comprising:
a WiFi-enabled control unit having a range of communications; and
a WiFi-enabled device, wherein the device is registered with the control unit such that the device cooperates with the control unit using WiFi communications to determine when the device is within the range of communications of the control unit, wherein when it is determined that the device is within the range of communications of the control unit, the device is functional, and when it is determined that the device is not within the range of communications of the control unit, the device is at least partially non-functional;
wherein the device is configured to periodically send an identifying signal to the control unit and the control unit is configured to send a return signal to the device when the identifying signal is received by the control unit;
wherein when the device is at least partially non-functional in a situation where it is determined that the device is not within the range of communications of the control unit, the device is configured to continue periodically sending the identifying signal to the control unit;
wherein the control unit is configured to produce an alert when it is determined that the device is not within the range of communications of the control unit;
wherein the control unit includes a control unit display, the control unit display being configured to display information associated with the device when it is determined that the device is not within the range of communications of the control unit;
wherein the device includes a device display, the device display being configured to display information associated with the control unit when it is determined that the device is not within the range of communications of the control unit;
wherein the device is configured to periodically send the identifying signal utilizing a period of time which is configured based on movements of an owner;
wherein the identifying signal includes information pertaining to a battery status of the device;
wherein the handheld security system is operable such that a range of communications of the device is set to match the range of communications of the control unit for avoiding signals of a first range from being received by the control unit from the device when the range of communications of the control unit is not large enough to enable a return signal to be sent from the control unit to the device;
wherein the handheld security system is operable such that, in response to the alert, the device is added to a list of lost or stolen devices;
wherein the handheld security system is operable such that the list of lost or stolen devices is maintained on a website for allowing a potential buyer of the device to determine whether the device is included in the list of lost or stolen devices.

24. The handheld security system according to claim 23 wherein the device includes a lockout interface, wherein when the device does not receive the return signal in response to the identifying signal, the device is not within the range of communications of the control unit and the lockout interface locks out the device and causes the device to be at least partially non-functional.

25. The handheld security system according to claim 24 wherein when the device receives the return signal, the lockout interface unlocks the device and causes the device to be functional.

* * * * *